United States Patent [19]
Jacquemot et al.

[11] Patent Number: 5,971,479
[45] Date of Patent: Oct. 26, 1999

[54] INFANT VEHICLE SEAT

[75] Inventors: Pierre Jacquemot, La Garenne-Colombes; Jean-Pascal Roy, Pontault-Combault, both of France

[73] Assignees: Automobiles Peugeot, Paris; Automobiles Citroën, Neuilly sur Seine, both of France

[21] Appl. No.: 08/960,451

[22] Filed: Oct. 29, 1997

[30] Foreign Application Priority Data

Nov. 6, 1996 [FR] France ................................. 96.13719

[51] Int. Cl.⁶ ........................................................ A47C 1/08
[52] U.S. Cl. ............................... 297/256.14; 297/250.1; 297/252; 297/254
[58] Field of Search ........................... 297/256.14, 250.1, 297/252, 253, 254, 256, 256.1, 256.16

[56] References Cited

U.S. PATENT DOCUMENTS

| | | | |
|---|---|---|---|
| 3,262,736 | 7/1966 | Merelis et al. ........................... | 297/253 |
| 4,113,306 | 9/1978 | von Wimmersperg .......... | 297/250.1 X |
| 4,321,784 | 3/1982 | Wood et al. . | |
| 4,345,791 | 8/1982 | Bryans et al. ....................... | 297/256.14 |
| 4,480,870 | 11/1984 | von Wimmersperg ......... | 297/256.14 X |
| 4,620,711 | 11/1986 | Dick ..................................... | 297/254 X |
| 4,707,024 | 11/1987 | Schräder ......................... | 297/256.14 X |
| 4,756,573 | 7/1988 | Simin et al. ........................... | 297/250.1 |
| 4,915,446 | 4/1990 | Darling et al. ...................... | 297/256.14 |
| 5,383,707 | 1/1995 | Osenkowski et al. ................... | 297/238 |
| 5,466,044 | 11/1995 | Barley et al. ..................... | 297/250.1 X |
| 5,487,588 | 1/1996 | Burleigh et al. ............... | 297/256.14 X |
| 5,524,965 | 6/1996 | Barley .............................. | 297/256.14 X |
| 5,553,918 | 9/1996 | Baret et al. .............................. | 297/237 |
| 5,669,663 | 9/1997 | Feuerherdt ......................... | 297/256.1 X |
| 5,685,603 | 11/1997 | Lane, Jr. ............................... | 297/252 X |
| 5,816,651 | 10/1998 | Feuerherdt ........................ | 297/250.1 X |
| 5,890,762 | 4/1999 | Yoshida ............................. | 297/256.16 X |

FOREIGN PATENT DOCUMENTS

| | | | |
|---|---|---|---|
| 0 383 123 A2 | 8/1990 | European Pat. Off. .......... | B60N 2/26 |
| 0 403853 A2 | 12/1990 | European Pat. Off. . | |
| 0 703 113 A3 | 3/1996 | European Pat. Off. . | |
| 0 714 806 A2 | 6/1996 | European Pat. Off. . | |
| 94 12 855 | 11/1994 | Germany ......................... | B60N 2/28 |

*Primary Examiner*—Peter M. Cuomo
*Assistant Examiner*—Rodney B. White
*Attorney, Agent, or Firm*—Pollock, Vande Sande & Amernick

[57] ABSTRACT

A child seat cooperating with a vehicle seat has a support frame comprising two lateral plates and at least one locking element at the rear of the support frame. A handle pivotably attached to the support frame has a central carrying portion and two pivotable lateral portions. A locking mechanism is positioned on at least one of the lateral plates and cooperates with a complementary element on the vehicle seat.

14 Claims, 1 Drawing Sheet

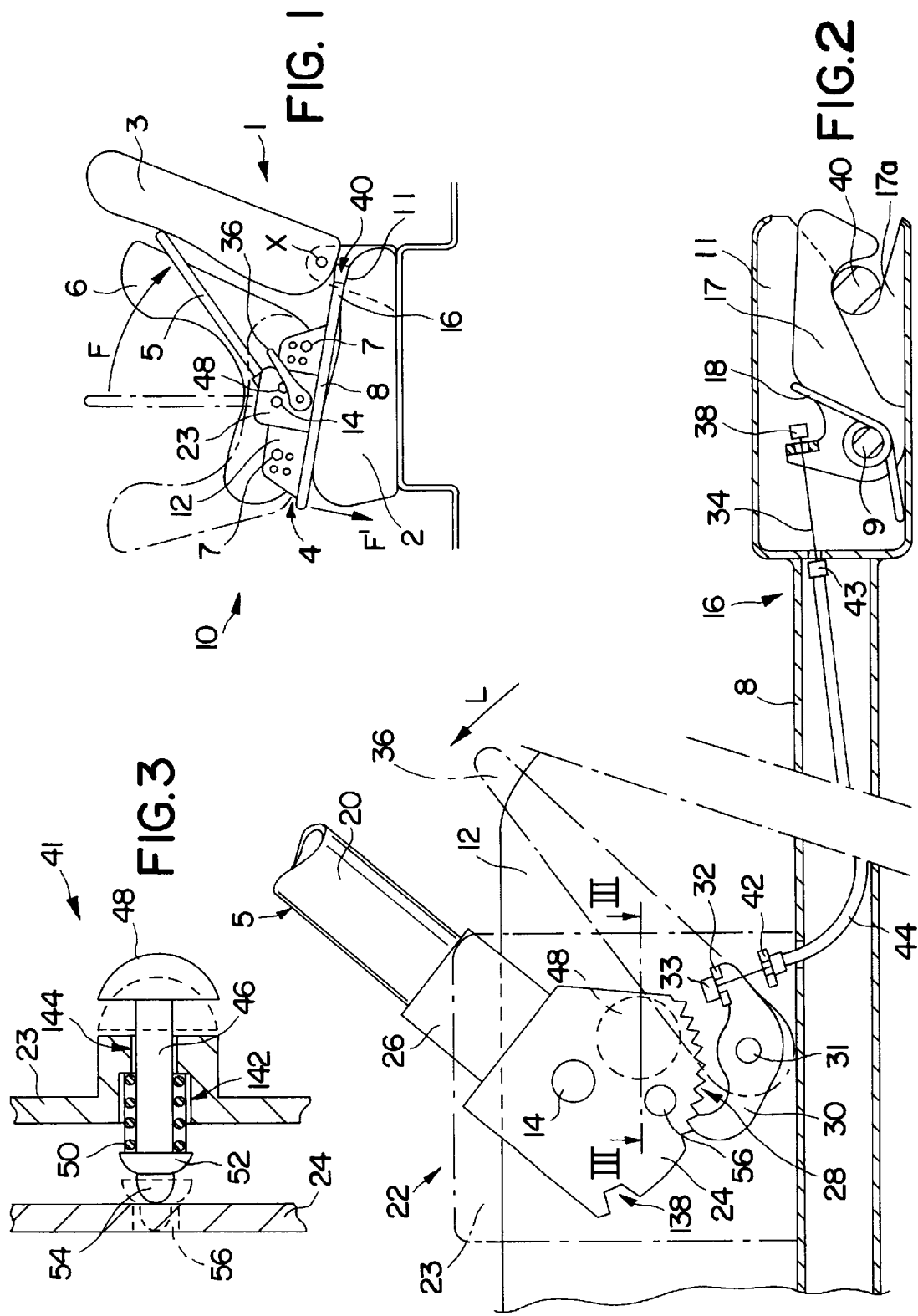

INFANT VEHICLE SEAT

FIELD OF THE INVENTION

The invention concerns a child seat that is adaptable for use on an automotive vehicle seat, as well as the associated vehicle seat.

BACKGROUND OF THE INVENTION

Child seats which may be adapted and attached to an automotive vehicle seat designed for an adult are known. These seats are mounted either in the front or the rear of the vehicle and are positioned facing the road or with the back to the road.

Such seats normally comprise a rigid, preferably one-piece structure, for example in the form of a shell, which serves as the seat bottom, and means for fastening the structure to the adult seat.

Attachment means may be devices allowing the use of the safety belt associated with the seat, or locking systems comprising a frame integral with one of the latching device elements, which cooperates with a second element mounted on the seat.

A device of this second type is, for example, described in Patent No. FR 95 02 438. In this document, the frame is fastened by two latching devices attached to the front of the bottom of the seat, and two latching devices attached to the rear. It has the advantage of making it possible to attach the seat more securely and more stably than with a device employing the safety belt mounted on the vehicle. However, it requires a large number of latching devices, so that the positioning thereof proves difficult, especially given that some locking mechanisms must be actuated blindly.

SUMMARY OF THE INVENTION

The invention is intended to remedy this disadvantage by replacing a portion of the locking devices with a fastening system that can be more easily handled.

To this end, the invention relates to a child seat adaptable on an automotive vehicle seat composed of a seat and a backrest, which comprises a support frame, a carrying handle joined to the support frame, and a structure or shell fitted with means for attachment to the support frame. The support frame incorporates two lateral plates and at least one locking element arranged on the rear portion and cooperating with a complementary element integral with the automobile seat. The carrying handle further constitutes a support arm which rests against the backrest of the seat of the vehicle, which can immobilize the child seat in rotation around the axis of the locking system thereof.

According to other features and/or variants of the invention:

The handle is composed of a central part forming a handle and two lateral members capable of pivoting around a transverse axis and of being immobilized in a determinate position by a locking mechanism positioned on at least one of the lateral plates of the support frame.

The handle-locking mechanism comprises a toothed sector made integral with the lower end of the lateral member thereof and concentric to the swivel pin of this member, whose toothing cooperates with a pawl which pivots on a pin mounted on the plate.

The pawl is made integral with a latch mechanism for grasping the connection piece of a control cable, whose end opposite the connection piece acts on the associated locking element.

An operating lever is integral with the axis of rotation of the pawl.

The locking element is composed of a V-shaped stationary slot and a bolt which is joined around a transverse pin and is returned to the locking position by a spring, the bolt cooperating with a bolt-clasp attached to the frame of the vehicle seat.

The end of the control cable hooks onto the bolt of the locking element.

The control cable is mounted in a jacket arranged between two stop-motion devices, one attached to the lateral plate and the other mounted on the stationary part of the locking element.

The position of one of these two stop-motion devices can be adjusted.

The toothed sector comprises a notch in which the pawl engages when the seat handle is in the vertical position, so as to lock the handle in position.

The toothed sector incorporates an opening which, when the seat handle is in the vertical position, is at a right angle with a movable push device mounted in a housing made in the wall of the protective casing which faces the toothed sector and is drawn by force to rest on the toothed sector by elastic return means.

The lateral plates comprise means for assembling the shell and the support of the child seat, which make it possible to place the shell of the seat either in a position facing the road or in a position in which the back faces the road.

The lateral plates comprise means for adjusting the slope and/or the translational movement of the shell on the support of the child seat.

The invention also relates to an automobile seat adapted so as to receive the child seat incorporating at least one of the preceding features.

The automobile seat may comprise at least one bolt-clasp constituted by a transverse rod forming the middle portion of a U-shaped arch attached to the frame of its backrest.

In a variant, the bolt-clasp configured as described above may be fastened to a transverse member belonging to the seat thereof.

BRIEF DESCRIPTION OF THE DRAWINGS

Other features and advantages of the invention will emerge from a reading of the detailed description to follow, for the understanding of which reference will be made to the attached drawings, in which:

FIG. 1 is a lateral view of a child seat according to the invention mounted on an automotive vehicle seat.

FIG. 2 is an enlarged view in partial cross-section in a vertical plane of the latching and locking mechanism in FIG. 1.

FIG. 3 is a partial cross-section along 3—3 in FIG. 2.

DESCRIPTION OF PREFERRED EMBODIMENT

FIG. 1 represents a automotive vehicle seat 1 comprising, in normal fashion, a seat bottom 2 and a backrest 3 jointed around a transverse axis X allowing adjustment of the inclination of the backrest.

A child seat 10 shown in solid lines in a position facing the road and in dotted lines in a position with the back toward the road is mounted on this vehicle seat 1. The child seat 10 comprises a support frame 4, a handle 5 which forms a support arm (as will be explained below) joined to the support frame 4, and a structure, or shell, 6 fitted with means 7 for attachment to the support frame 4.

The support frame 4 may be made in different ways. In the example shown, it is composed of two longitudinal members 8 connected, for example, by two transverse members or by a reinforcement plate.

Each of the longitudinal members 8 is fitted, at one of its ends (16), with an element 11 belonging to a locking system. This element incorporates a V-shaped slot 17a in the end of the longitudinal member, and a latch 17 pivoting around a transverse pin 9 and returned to the locking position by a spring 18.

Each of the longitudinal members 8 carries, adjacent its end opposite the end 16 carrying the locking element, a lateral plate 12.

As was seen above, child seat 10 further comprises a handle 5 composed of a central carrier portion and two lateral members 20 each joined to one of the lateral plates 12 of the support frame 4 so as to be rotatable about a transverse pivot pin 14.

The handle 5, which makes the seat 10 portable when it is not mounted in the child vehicle, also constitutes a support arm that can pivot around the pivot pin 14 and can be locked in a determinate position by a locking mechanism 22 arranged on at least one of the lateral plates 12.

The locking mechanism 22 is shown in FIG. 2; it is housed in a protective casing 23 and comprises a toothed sector 24 integral with the lower end 26 of the lateral member 20 of the handle and concentric with the pivot pin 14 of this member.

The toothing 28 of the sector 24 cooperates with a pawl 30 which pivots on a pin 31 mounted on the plate 12 parallel to the pivot pin 14. The pawl 30 is integral both with a catch device 32 that engages the connection piece 33 of a cable 44, and with an operating lever 36 which also pivots on pin 31.

The cable 34 extends through the longitudinal member 8 associated with the plate 12, and the end 38 thereof opposite the connection piece 33 hooks onto the latch 17 of the locking element 11 borne by the longitudinal member. The cable is mounted in a sheath 44 positioned between two stop-motion devices, the other stop 42 being fastened to the plate 12 and one stop 43 being mounted on a stationary part of the locking element 11.

The position of one of the two stops 42 and 43 may be adjustable. This adjustment makes it possible to exert a tractive force on the cable 34, and thus to release the locking element 11, only after releasing the system 22 for immobilizing handle 5, as will be explained hereinbelow.

It will be noted that means for assembling the shell 6 and the support 4 are provided, for example on the lateral plates, which make it possible to position the seat shell either in a position facing the road, as illustrated in solid lines in FIG. 1, or in a position in which the back faces the road, as shown in broken lines in the same figure. Conventionally, the attachment may comprise adjustment of the inclination of the seat 10 and/or adjustment of the translational motion of this seat. These adjustments allow the position of the seat to be changed to adapt to the morphology of the child occupying it.

Each locking element 11 of the child seat 10 is fastened to the seat 1 of the vehicle by means of a keeper 40 fastened to the frame of the seat 1, at the intersection of the cushion of the seat bottom 2 and the backrest 3, and on which the latch 17 of the associated locking element 11 snaps in place.

In the embodiment shown, the keeper 40 is a transverse rod which constitutes the middle portion of a U-shaped arch that is welded either to the frame of the seat back 3 or to a sufficiently strong transverse element associated with the seat bottom 2, for example a reinforcement bar.

This device constitutes the system for immobilizing the child seat in the longitudinal direction of the vehicle. To ensure its immobilization against rotation around the keeper 40, the handle 5 forms a support arm against the backrest 3 of the seat.

To this end, it is pivoted from a substantially vertical position (shown in dotted lines in FIG. 1) in the direction of the seat back, in the direction of the arrow F, until the central portion thereof rests against the seat back. Preferably, a downward force F' is exerted on the free end of the longitudinal members 8.

The engagement of the pawl 30 in the toothed sector 24 of the locking system locks the handle 5 in the determinate support position and prevents the backward return thereof, thus constraining the child seat 10 on the vehicle seat 1.

The child seat 10 is thus attached in two simple, rapid operations using means which are easily accessible. Furthermore, it adapts naturally to different angular positions of adjustment of the seat back of the seat, since the handle can adopt an indeterminate number of angular positions and the locking system is itself adjustable automatically as a function of these positions.

Disassembly is also easily achieved. It suffices to pivot the operating lever 36 in the direction of the arrow L (FIG. 2) to release the pawl 30 from the toothed sector 24. Simultaneously, a tractive force is exerted on the cable 34, causing the latch 17 to pivot in the direction of its release from the keeper 40, against the force of return spring 18. The forward pivoting motion of the handle 5 is once again possible. The child seat 10 can then be removed from the vehicle by using the handle 5.

When used to transport the seat, the handle 5 can be locked in a substantially vertical position.

FIGS. 2 and 3 illustrate two embodiments of the locking device.

The first is constituted by a notch 138 cut in the toothed sector 24, in which the pawl 30 engages when the handle 5 is in the vertical position.

As shown in FIG. 3, the second locking device is formed from a movable push device 41 mounted in a housing 142 made in the wall of the casing 23 facing the toothed sector 24. The bottom of the housing 142 is pierced by an opening 144, through which the rod 46 of the push device extends, this rod carrying at its end an operating button 48. A spring 50 is mounted so as to be supported between the bottom of the housing 142 and a collar 52 carried by the anterior end 54 of the push device 41. The spring 50 acts on the push device in such a way that the end 54 of this device is drawn by force to rest on the toothed sector 24.

The toothed sector 24 has an opening 56 which, when the handle 5 is in the vertical position, is at a right angle to the push device 41. The end 54 of the push device then engages in the opening 56 so as to make the toothed sector 24 integral with the casing 23.

To release the handle, it is sufficient to pull on the operating button 48 of the push device in order to disengage its end 54 from the opening 56.

We claim:

1. A child seat cooperating with an automotive vehicle seat constituted by a seat bottom and a backrest, comprising a support frame, a handle pivotably attached to said support frame, and a structure attached to said support frame by means for attachment, said support frame consisting of two lateral plates and at least one locking element positioned in a rear portion of said support frame and cooperating with a complementary element on a said vehicle seat, wherein the handle constitutes a support arm for resting against the backrest of the seat, which can lock the child seat against rotation around a rotational axis of the locking system, and wherein said handle is composed of a central portion which constitutes both a carrying handle and support bar, and two lateral portions adapted to pivot around a transverse pivot pin and to be locked in a determinate position by a locking mechanism positioned on at least one of said lateral plates.

2. The child seat according to claim 1, wherein the locking mechanism comprises a toothed sector integral with a lower end of the lateral member and concentric to said pivot pin, and wherein toothing of said toothed sector cooperates with a pawl which pivots on a pin mounted on a said lateral plate parallel to said pivot pin.

3. The child seat according to claim 2, wherein the toothed sector comprises a notch in which the pawl engages when the handle is in a vertical position, so as to lock the handle.

4. The child seat according to claim 2, wherein the toothed sector incorporates an opening which, when the handle is in vertical position, is at a right angle to a movable push device mounted in a housing made in a wall of the casing facing the toothed sector and drawn by force so as to be supported on the toothed sector by a resilient return device.

5. The child seat according to claim 2, wherein the pawl is integral with a device for grasping a connection piece disposed at one end of a cable, said cable having another end located opposite said one end and acting on an associated locking element.

6. The child seat according to claim 5, wherein said seat comprises an operating lever integral with an axis of rotation of the pawl.

7. The child seat according to claim 1, wherein the locking element is constituted by a stationary V-shaped cutout and a latch arranged to pivot around a transverse pin and returned to a locking position by a spring, said latch cooperating with a keeper fastened to the support frame of said vehicle seat.

8. The child seat according to claim 7, wherein the end of a cable is latched onto the bolt belonging to the locking element.

9. The child seat according to claim 8, including a cable mounted in a sheath positioned between two stop-motion devices, one of said stop-motion devices being fastened to the plate and the other of said stop-motion devices being mounted on a stationary part of the locking element.

10. The child seat according to claim 9, wherein a position of one of the two stop-motion devices is adjustable.

11. The child seat according to claim 1, wherein the lateral plates comprise means for assembling the a shell and the support frame of the seat, which make it possible to place said, seat either in a forwardly facing or in a backward facing position in a direction of travel.

12. The child seat according to claim 11, wherein the lateral plates comprise means for adjusting inclination and/or translational motion of the shell on the support frame of the child seat.

13. The child vehicle seat according to claim 1, wherein said child seat comprises at least one keeper constituted by a transverse rod forming a middle portion of a U-shaped arch fastened to a frame of the backrest of said vehicle seat.

14. The automotive vehicle seat according to claim 1, wherein said seat comprises at least one keeper constituted by a transverse rod forming the middle portion of a U-shaped arch fastened to a transverse member of a bottom of said vehicle seat.

* * * * *